United States Patent [19]

Meyer et al.

[11] Patent Number: 4,599,212

[45] Date of Patent: Jul. 8, 1986

[54] LAMINATES HAVING AN IMPROVED FINISHING LAYER

[75] Inventors: Nicolas Meyer, Lens; Michel Cousin, Loison sous Lens, both of France

[73] Assignee: Societe Chimique des Charbonnages S.A., Paris, France

[21] Appl. No.: 567,124

[22] Filed: Dec. 30, 1983

[30] Foreign Application Priority Data

Dec. 30, 1982 [FR] France ................................ 82 22060

[51] Int. Cl.$^4$ ........................ B29C 71/00; B32B 27/08
[52] U.S. Cl. .................................... 264/255; 264/258; 427/133; 427/407.3; 428/290; 428/525
[58] Field of Search ...................... 264/255, 257, 258; 428/525, 290; 427/133, 402, 407.3

[56] References Cited

U.S. PATENT DOCUMENTS

| | | | |
|---|---|---|---|
| 4,022,942 | 5/1977 | Anderson et al. | 428/290 |
| 4,283,462 | 8/1981 | Meyer et al. | 264/257 |

FOREIGN PATENT DOCUMENTS

| | | | |
|---|---|---|---|
| 2280300 | 3/1976 | France | 428/525 |

OTHER PUBLICATIONS

Chemistry and Applications of Phenolic Resins, Editors Springer-Verlag, Berlin-Heidelberg-New York, Knop-Scheib, 1979, p. 94.

Chemistry and Applications of Phenolic Resins, A. Knop-W. Scheib, p. 158.

Organic Coating Technology, vol. II-p. 1352, 1358 (Henry Fleming Page).

*Primary Examiner*—Donald Czaja
*Assistant Examiner*—V. Fischbach
*Attorney, Agent, or Firm*—Millen & White

[57] ABSTRACT

Reinforced phenolic laminates are provided with a finishing coat of a butylated phenol-formaldehyde resin, thereby removing surface irregularities. The finishing coat can be mass-pigmented to the desired color, thereby obviating the necessity of any additional color-containing coatings.

10 Claims, No Drawings

LAMINATES HAVING AN IMPROVED FINISHING LAYER

BACKGROUND OF THE INVENTION

This invention relates to laminates of phenolic resins coated with a finishing layer to remove surface irregularities.

Laminates comprising several successive layers of fiber reinforced phenolic resins are known in the art. They are described, for example, in the "Encyclopedia of Polymer Science and Technology", Interscience Publishers, 1970, V. 12, page 1 "Reinforced Plastics" and V. 8, page 121 "Laminates". Glass fibers are the preferred reinforcing agents. A composite material of this type in the majority of cases shows, at the surface, imprints of insufficiently impregnated fibers. If attempts are made to mask these surface flaws by directly applying a coating to the laminate, for example, a coating based on a polyurethane binder, the surface appearance of the material obtained remains poor and a smooth surface is not achieved.

To overcome these disadvantages it has been proposed to initiate the production of the laminate by applying directly onto the mold, provided with a mold release agent, a layer of a non-reinforced resin, this layer usually being referred to as a "gel coat". This layer adheres to the laminate and may, where appropriate, form a supporting layer for, e.g., a coat of paint. However, depending on the resins employed to produce the "gel coat", the results obtained are not satisfactory. Thus, for example, there have been proposed "gel coats" of phenolic resin for coating glass fiber-reinforced phenolic laminates; in that case, the surface obtained exhibits micro-pitting and the imprint of the fibers. The micro-pitting and the outline of the fibers can be removed by depositing a thicker layer of phenolic resin but in that case the appearance of micro-crazing or crackling is observed. It has also been proposed to use a "gel coat" of unsaturated polyester resin; in that case, the surface hardness obtained is inadequate.

In order to solve all these problems and in particular to obtain laminates which exhibit neither crackling nor micro-crazing and have good hardness, it has been proposed to coat laminates based on phenolic resin with a furan-based "gel coat", U.S. Pat. No. 4,283,462 issued Aug. 11, 1981. Unfortunately, the materials so coated have the disadvantage of being dyed in the color of the furan resins, namely black. It is therefore necessary to coat them with another thermosetting resin suitably pigmented, if a material exhibiting a different color is required.

SUMMARY OF THE INVENTION

An object of the invention is to provide laminates of reinforced phenolic resin provided with a coating of a finishing layer having a surface which exhibits neither an imprint of the reinforcing fibers nor crackling even after long storage, and also has improved surface hardness.

Another object is to provide such a coating which is pigmentable itself to obtain a desired non-black color.

Upon further study of the specification and appended claims, further objects and advantages of this invention will become apparent to those skilled in the art.

DETAILED DISCUSSION

To attain these objects, laminates based on reinforced phenolic resins are coated at least on one side with a finishing layer of a composition based on butylated phenolic resins, said layer being directly bonded to the reinforced phenolic resin laminate.

It has been found that the butylated phenolic resin makes it possible to obtain, at one and the same time, a smooth coating having good surface hardness as well as improved flexibility, which avoids the shrinkage and crazing phenomena. Moreover, this coating has the advantage that it can be directly mass-pigmented, in the desired shade, thereby eliminating the necessity of providing additional layers of other types of pigmented resins having a thickness of at least 200 microns as is the case when furan resins are used. (By "mass-pigmented" is meant homogenously pigmented throughout the whole body of laminate. The butylated coating can also be painted without any intermediate preparation steps, e.g., sanding or scrubbing.

The butylated phenolic resin is prepared in a known manner either by dehydrating a resol without butanol or by etherifying a phenolic resin of the resol type with butanol or by direct condensation of formaldehyde, phenol and butanol at a pH of not less than 7. The water formed or already present, depending on the process, is removed by azeotropic distillation. Regardless of the process used for the production of the butylated resin, the percentage of water in the resin should not exceed 5%. If the butylated resin contains amounts of water greater than 5%, micro-pitting is subsequently observed on the surface of the finished product. Under those circumstances it is preferable to concentrate the butylated resin to the maximum extent, so that it contains a minimum amount of water. Used butanol is n-butyl alcohol, iso-butyl alcohol, sec butyl alcohol or ter-butyl alcohol. Butylated phenolic resin are described, for example in "CHEMISTRY and APPLICATIONS OF PHENOLIC RESINS" p. 94-Ed: SPRINGER-VERLAG-Berlin-Heidelberg-NEW YORK, Auth: KNOPSCHEIB (1979).

The crosslinking or hardening of this resin is conducted by means of a known acid catalyst used for the hardening of phenolic resins. This catalyst can be an arylsulphonic acid such as benzenesulphonic acid or paratoluenesulphonic acid, or a mixture of these acids with strong mineral acids such as sulphuric acid or phosphoric acid. Various adjuvants, such as mineral filler, solvent, thixotropic agents or surface active spreading agents can be added to the butylated phenolic resin before hardening. The mineral filler must be inert to acids. The solvent is, for example, a glycol or acetone. The thixotropic agent is, for example, pyrogenic silica, bentonite, amorphous silica or hydrated alumina.

The butylated phenolic resin, containing catalyst and optionally with one or more adjuvants added, can be coated on a pre-prepared phenolic resin laminate. It is preferred, however, for the coating to be applied by the gel-coat technique. In this case, the layer of butylated phenolic resin is applied in a known manner to the face or faces of a mold onto which there are subsequently deposited successive alternate layers of phenolic resin and reinforcing agent. The butylated phenolic resin is applied manually, by means of a gun, to the mold so as to form thereon a layer of thickness generally ranging from 0.1 to 2 mm. Most often it is preferred for the thickness to be less than 1 mm.

The butylated phenolic resin can be either substantially hardened or hardened in part.

On the layer thus obtained lamination may be carried out in a known manner, using a phenolic resin and reinforcing agent, either by cold layup or by hot pressing or by injection or by filament winding.

The phenolic resin used for the manufacture of the laminates of the invention is conventional, preferably a resol, in particular a resol obtained by polycondensation of formaldehyde and phenol in the presence of sodium hydroxide. Hardening is achieved by addition of an acid catalyst. Preferably, para-toluenesulphonic acid is used because it is very suitable both for the hardening of the reinforced phenolic resin and for the hardening of the butylated phenolic resin. Thus, a concentrated aqueous solution of para-toluenesulphonic acid is preferably used as the catalyst for hardening these two resins.

The phenolic resin as well as the butylated phenolic resin may contain various adjuvants such as fillers, solvents and plasticizers, in particular polyalcohols. All the known reinforcing agents of phenolic resins, in particular reinforcing agents based on glass fibers, can be used.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever. In the following examples, all temperatures are set forth uncorrected in degrees Celsius; unless otherwise indicated, all parts and percentages are by weight.

EXAMPLE 1

Preparation of the Butylated Phenolic Resin 3,000 parts of a phenol-formaldehyde resin obtained by condensing formaldehyde with phenol in a molar ratio of formaldehyde/phenol=1.5, the resin having a viscosity of 1 Pa.s at 20° C. (10 poises) and a solids content (measured by heating 4 g of resin in an oven at 140° C. for 3 hours) of 75% are introduced into a reactor equipped with a distillation column and a condenser, and are neutralized to pH 7 by addition of lactic acid, followed by 812 g of butanol. Distillation in vacuo at a pressure of 600 mm Hg yields 3.180 g of butylated phenolic resin, having a solid content of 80.5% and viscosity of 4.5 Pa.s at 20° C. (45 poises). The resin contains 10.8% of butanol and 1.55% of water. Then it was added 10% by weight of dipropylene glycol as solvent.

The butylated phenolic resin thus obtained is used for the production of a laminate, as follows:

A layer of butylated phenolic resin composition, 0.3 mm thick, is applied by means of a gun onto a mold treated with a mold release agent consisting of Carnauba wax; the resin composition contains the following components (in parts by weight):

Butylated phenolic resin . . . 100
Hydrated alumina . . . 75
Silica . . . 25
Titanium oxide . . . 7.5
Acetone . . . 15
70% strength para-toluenesulphonic acid solution in isopropanol . . . 10.

The layer of butylated phenolic resin is allowed to harden for 30 minutes in an oven kept at a temperature of 70° C. Thereafter a mat of glass fibers is deposited on this layer, followed by a layer of phenolic resin obtained by condensing formaldehyde with phenol in a molar ratio of formaldehyde/phenol=1.5, the resin having a viscosity of 1 Pa.s at 20° C. and a solids content of 75%, and containing 10% of dipropylene glycol. To this resin have been added 8 parts of a catalyst consisting of an aqueous solution containing 50 parts of para-toluenesulphonic acid and 5 parts of phosphoric acid.

The layer is allowed to harden to 40° C. for 1 hour and the laminate obtained is released from the mold. The laminate has a perfectly smooth surface, devoid of micropitting, on the side of which there is a layer of the butylated phenolic resin.

EXAMPLE 2

The surface of the butylated "gel coat" of the laminate prepared in Example 1 is coated, by means of a gun, with a blue paint usually employed in cars fabrication.

After hardening, a laminate is obtained which has a perfectly smooth painted surface, devoid of pitting. The butylated "gel coat" can thus be covered directly with a paint, without special preparation.

EXAMPLE 3

3,760 part of phenol, 4,300 parts of a 50% strength formaldehyde solution and 1,185 parts of butanol are introduced into a reactor. These reagents are condensed at pH 8.5 by adding 16 g of sodium hydroxide and heating under reflux for 90 minutes. After neutralization with lactic acid to a pH of 6.9, 5,700 g of a butylated resin which contains 4.9% of butanol and 1.3% of water are obtained.

EXAMPLE 4

The following are added to 100 parts of the butylated resin prepared in Example 3:

Hydrated alumina . . . 75 parts
Ground silica . . . 25 parts
Titanium oxide . . . 7.5 parts
A red pigment sold by Messrs. FERRO under the trademark V 500 . . . 15 parts
Pyrogenic silica . . . 0.5 parts.

This filled and pigmented resin is applied, as in Example 3, in a mold for the production of a laminate. The butylated resin is hardened with 8 parts of a catalyst consisting of a solution of para-toluenesulphonic acid in isopropanol and is then treated for 30 minutes in an oven at 70° C.

An 0.35 mm thick layer of butylated phenolic resin is applied by means of a doctor blade, equipped with a calibrated recess at its base, onto a mold treated with a mold release agent. The butylated phenolic resin composition contains the following components (the amounts being expressed in parts by weight):

Butylated phenolic resin . . . 100
Dipropylene glycol . . . 5
A red pigment sold by Messrs. FERRO under the trademark V 500 . . . 20
Spreading agent . . . 0.3
70% strength solution of para-toluenesulphonic acid in propan-2-ol . . . 8.

The layer of butylated phenolic resin is allowed to harden for 25 minutes in an oven at 75° C. A mat of glass fibers is then deposited on this layer, followed by a layer of phenolic resin obtained by condensing formaldehyde with phenol in a ratio of formaldehyde/phenol=1.5, the resin having a viscosity of 1 Pa.s at 20°

C. and a solids content of 75%, and containing 10% of dipropylene glycol. To this resin have been added 8 parts of a catalyst consisting of an aqueous solution containing 60% of para-toluenesulphonic acid and 5% of phosphoric acid.

A laminate is produced by employing glass fibers and the same phenolic resin as used in Example 3.

After hardening in an oven, a material is obtained which is colored on the side on which there is the layer of butylated phenolic resin, the layer being devoid of micro-pitting.

EXAMPLE 5

Example 1 is repeated, but using a butylated phenolic resin which after concentration in vacuo contains 5.5% of water.

A laminate is produced from this resin in accordance with the process described in Example 1. After release from the mold, a material having extensive micro-pitting is obtained.

The preceding examples can be repeated with similar success by substituting the generically or specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. In a process for producing a reinforced phenolic resin laminate comprising applying a coating directly to at least one side of said phenolic resin laminate to remove surface irregularities, the improvement wherein said coating is a composition consisting essentially of a butylated phenolic resin containing not more than 5% water.

2. A process according to claim 1 comprising depositing said coating of butylated phenolic resin on a mold, depositing alternating layers of phenolic resin and reinforcing agent, hardening the laminate, and then withdrawing resultant laminate from the mold, said laminate having no surface irregularities due to pitting or fiber projection.

3. A process according to claim 1, wherein the butylated phenolic resin is substantially hardened prior to said depositing of alternate layers.

4. A process according to claim 1, wherein the butylated phenolic resin is hardened by using an aqueous concentrated solution of paratoluenesulfonic acid.

5. A process according to claim 1, wherein the phenolic resin is obtained by condensing formol and phenol in the presence of a basic agent, and it contains a plasticizer.

6. A process according to claim 1, wherein the butylated phenol resin is mass-pigmented.

7. A laminate produced according to claim 1.

8. A laminate produced according to claim 2.

9. A laminate produced according to claim 5.

10. A process according to claim 1, wherein the reinforced phenolic resin laminate is reinforced with glass fibers.

* * * * *